(12) United States Patent
Blair et al.

(10) Patent No.: US 9,369,701 B2
(45) Date of Patent: Jun. 14, 2016

(54) METHOD AND SYSTEM FOR REMOTE DIAGNOSTICS

(71) Applicant: THOMSON LICENSING, Issy de Moulineaux (FR)

(72) Inventors: Ronald Lynn Blair, Liverpool, NY (US); Stephen Dale Hoskins, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/223,246

(22) Filed: Mar. 24, 2014

(65) Prior Publication Data

US 2014/0218542 A1 Aug. 7, 2014

Related U.S. Application Data

(63) Continuation of application No. 10/472,893, filed as application No. PCT/US02/07871 on Mar. 15, 2002, now abandoned.

(60) Provisional application No. 60/277,183, filed on Mar. 20, 2001.

(51) Int. Cl.
*H04N 17/04* (2006.01)
*H04N 7/173* (2011.01)
(Continued)

(52) U.S. Cl.
CPC ............... *H04N 17/04* (2013.01); *H04N 7/173* (2013.01); *H04N 17/004* (2013.01); *H04N 17/02* (2013.01);
(Continued)

(58) Field of Classification Search
CPC .................. H04N 21/4424; H04N 21/25808; H04N 21/6332
USPC ....................................................... 725/9, 14
See application file for complete search history.

(56) References Cited

U.S. PATENT DOCUMENTS 4,987,486 A * 1/1991 Johnson et al. ............... 725/131
5,434,650 A 7/1995 Nakahara et al.
(Continued)

FOREIGN PATENT DOCUMENTS

JP 3206796 9/1991
JP 06178026 6/1994
(Continued)

*Primary Examiner* — Olugbenga Idowu
(74) *Attorney, Agent, or Firm* — Robert D. Shedd; Vincent E. Duffy; Michael A. Pugel

(57) ABSTRACT

The present invention is directed towards a method and system for remote diagnostics in a Digital Subscriber Line (DSL) set-top box network having a head-end unit and a set-top box having diagnostics software. The diagnostics software stored in the set-top box enables the head-end unit to remotely query the set-top box about the current condition of the set-top box and, as a result, reduces the necessity of service calls and/or shipping charges that would otherwise be required. The diagnostics software generates data is response to a set-top box identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request received from the head-end. Execution of the diagnostics software may be initiated as part of a periodical diagnostic test of the set-top box, at the request of a customer having difficulties with the set-top box, or in response to an alarm or alert message generated by the set-top box.

36 Claims, 6 Drawing Sheets

(51) Int. Cl.
*H04N 21/258* (2011.01)
*H04N 21/442* (2011.01)
*H04N 21/6332* (2011.01)
*H04N 21/654* (2011.01)
*H04N 21/6543* (2011.01)
*H04N 21/81* (2011.01)
*H04N 17/00* (2006.01)
*H04N 17/02* (2006.01)

(52) U.S. Cl.
CPC ..... *H04N 21/25808* (2013.01); *H04N 21/4424* (2013.01); *H04N 21/6332* (2013.01); *H04N 21/654* (2013.01); *H04N 21/6543* (2013.01); *H04N 21/8166* (2013.01)

(56) References Cited

U.S. PATENT DOCUMENTS

| | | | |
|---|---|---|---|
| 5,446,522 A | 8/1995 | Tahara et al. | |
| 5,506,892 A | 4/1996 | Kojima et al. | |
| 5,654,750 A * | 8/1997 | Weil et al. | 348/143 |
| 5,818,512 A | 10/1998 | Fuller | |
| 5,857,190 A | 1/1999 | Brown | |
| 5,867,206 A * | 2/1999 | Voght et al. | 725/107 |
| 6,138,121 A | 10/2000 | Costa et al. | |
| 6,430,481 B1 * | 8/2002 | Lovelace et al. | 701/19 |
| 6,519,612 B1 | 2/2003 | Howard et al. | |
| 6,701,528 B1 * | 3/2004 | Arsenault et al. | 725/89 |
| 6,915,531 B2 * | 7/2005 | Yun | 725/131 |
| 2002/0073428 A1 * | 6/2002 | Gurevich et al. | 725/86 |
| 2002/0129375 A1 * | 9/2002 | Kim et al. | 725/100 |
| 2005/0028206 A1 * | 2/2005 | Cameron et al. | 725/46 |

FOREIGN PATENT DOCUMENTS

| | | |
|---|---|---|
| JP | 06290071 | 10/1994 |
| JP | 07236096 | 9/1995 |
| JP | 06284216 | 4/1996 |
| JP | 8087618 | 4/1996 |
| JP | 08171524 | 7/1996 |
| JP | 10161901 | 6/1998 |
| JP | 10207478 | 8/1998 |
| JP | 200020432 | 1/2000 |
| JP | 2000040063 | 2/2000 |
| JP | 2000184034 | 6/2000 |
| WO | WO9963759 | 12/1999 |

* cited by examiner

METHOD AND SYSTEM FOR REMOTE DIAGNOSTICS

This application is a continuation of applicant's co-pending U.S. application Ser. No. 10/472,893, filed Sep. 17, 2003, which claims the benefit under U.S.C. §365 of International Application PCT/US2002/07871, filed Mar. 15, 2002, which claims the benefit under 35 U.S.C. §119 (e) of U.S. provisional patent application Ser. No. 60/277,183 filed on Mar. 20, 2001.

FIELD OF THE INVENTION

The present invention relates to a method and system for remote diagnostics of a device, and more particularly, to remote diagnostics of a set-top box in a DSL-based television network.

BACKGROUND OF THE INVENTION

An exemplary cable set-top box network is illustrated in FIG. 6. The network 600 includes a head-end unit 602 connected to a plurality of set-top boxes (STBs) 604 and TVs 606 over a shared network connection 608. Cable set-top box service and support typically involves either a customer shipping a set-top box to a service center for repair or requiring a service technician to be sent out to a customer site to repair the set-top box. However, not all problems require the set-top box to be repaired. For example, repair of the set-top box is not necessary if the customer incorrectly connects a set-top box to a television. Unfortunately, there is currently no way for a cable set-top box service and support provider to remotely diagnose a problem with a set-top box. As a result, any problem encountered by a user of a set-top box often results in a costly shipping expense or service call.

The present invention is directed towards reducing these costs and expenses.

SUMMARY OF THE INVENTION

The present invention is directed towards a method and system for remote diagnostics in a Digital Subscriber Line (DSL) set-top box network having a head-end unit and a set-top box having diagnostics software. The diagnostics software stored in the set-top box enables the head-end unit to remotely query the set-top box about the current condition of the set-top box and, as a result, reduces the necessity of service calls and/or shipping charges that would otherwise be required. The diagnostics software generates data is response to a set-top box identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request received from the head-end. Execution of the diagnostics software may be initiated as part of a periodical diagnostic test of the set-top box, at the request of a customer having difficulties with the set-top box, or in response to an alarm or alert message generated by the set-top box.

DETAILED DESCRIPTION OF THE PREFERRED EMBODIMENT

The characteristics and advantages of the present invention will become more apparent from the following description, given by way of example.

Figure 1:
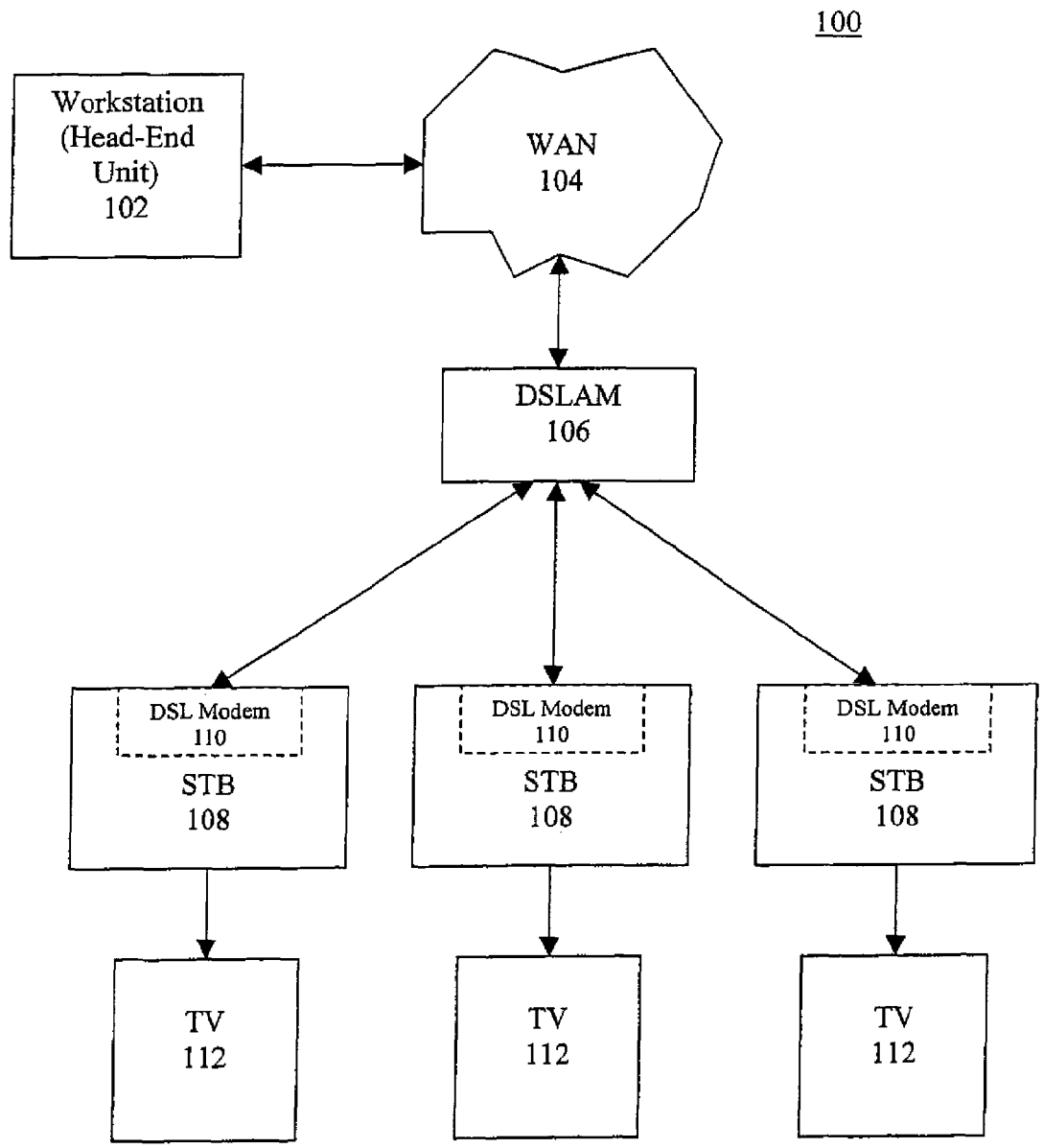
FIG. 1 is a block diagram of an exemplary DSL-based set-top box network configured to support the present invention.

Referring now to FIG. 1, an exemplary Digital Subscriber Line (DSL) based set-top box network 100 is shown. Network 100 includes a workstation or head-end unit 102, a Wide-Area Network (WAN) 104, a Digital Subscriber Loop Access Module (DSLAM) 106, a plurality of Set-Top Boxes (STBs) 108 having DSL modems 110 and processors (not shown) and storage mediums (not shown), and a plurality of Televisions (TVs) 112. More specifically, head-end unit 102 is located in a central location and connected by WAN 104 to the individual residences that it serves. At the edge of the network on the residential side, DSLAM 106 communicates with the DSL modem 110 in the STB 108 in each of the homes.

With a DSL STB 108, it is possible for the head-end unit 102, through Simple Network Management Protocol Management Information Bases (SNMP MIBs) to set a flag in a given STB 108 to cause the STB 108 to go into service mode and, in turn, cause the STB 108 to send diagnostics back to the head-end unit 102. This is possible because the DSL set-top box network 100 (unlike cable set-top box network 600) provides a private digital connection between the head-end unit 102 and the STB 108 in the customer's private residence. The private digital connection (unlike the shared connection 608 of the conventional cable network 600) is not shared with any other STB 108 in any other residence. As a result, diagnostic messages (discussed in further detail below) may be bi-directionally transmitted back and forth between the head-end unit 102 and a given STB 108 without the risk of a neighbor's system being able to eavesdrop or even masquerade as the head-end unit 102. As can be appreciated, the use of remote diagnostics reduces the need for a service call, or for the unit to be replaced or repaired. Even if a repair is necessary, the root cause will have been identified via the remote diagnostics. If the problem is a connection issue, the problem can be remotely diagnosed without costly service calls or repairs, as discussed in further detail below.

Figure 2:
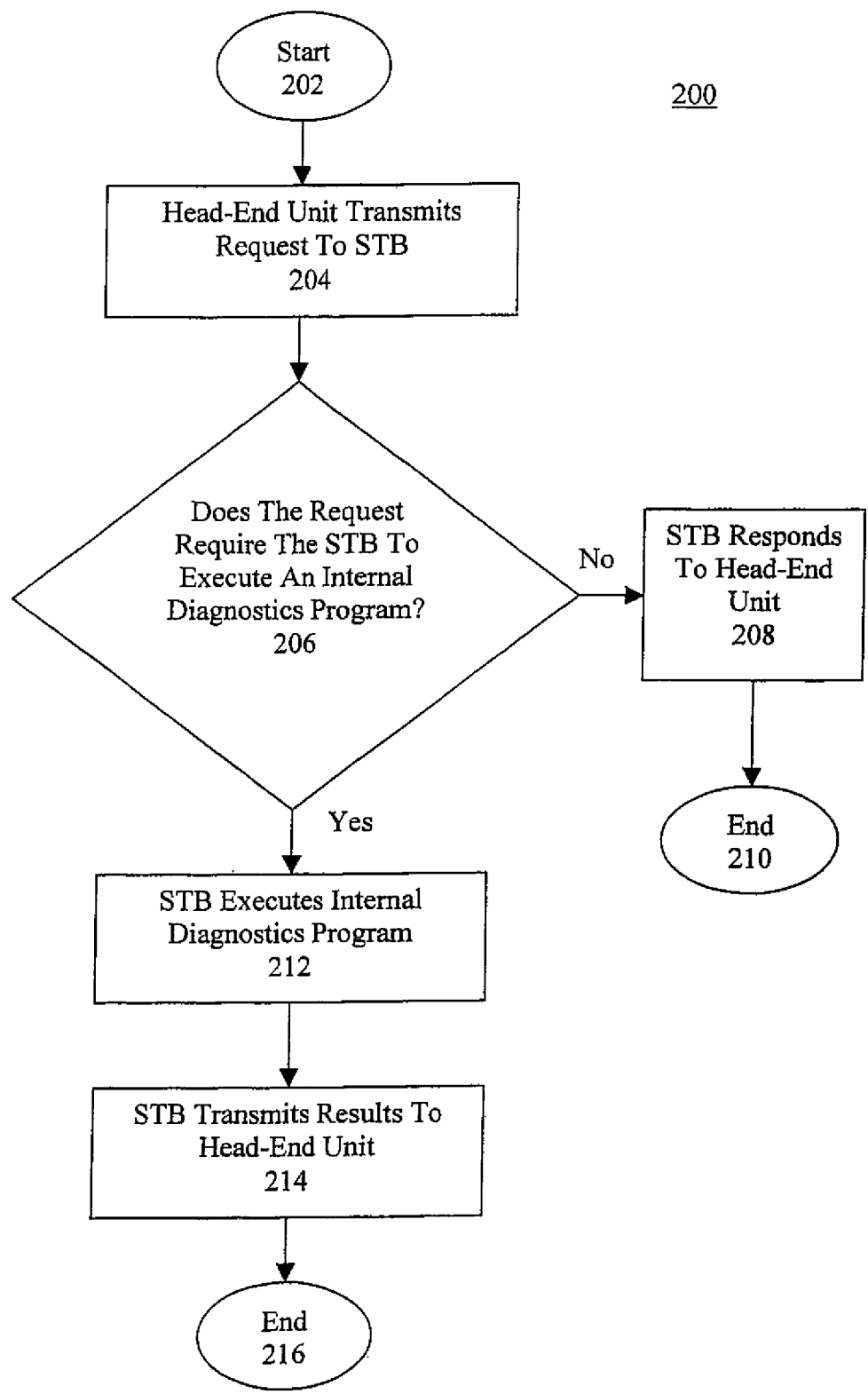
FIG. 2 is a flowchart of a remote diagnostics process of the present invention.

Referring now to FIG. 2, a flowchart of a remote diagnostics process 200 of the present invention is shown. Process 200 may be initiated, at step 202, by a technician located at head-end unit 102. The technician may start process 200 as part of a periodical diagnostic test of a given STB 108, at the request of a customer having difficulties with his or her STB 108, in response to an alarm or alert message received from an STB 108, or for other reasons known by those skilled in the art. Upon startup head-end unit 102 transmits a request to a selected STB 108 using an SNMP "Get Request, "Get Next Request," or "Get Bulk Request" message. Upon receipt of the request STB 108 (or more specifically, an internal processor of STB 108), at step 206, determines if the received request requires the STB 108 to execute an internal diagnostics program. If not, STB 108 transmits, at step 208, a response (discussed in further detail below) back to head-end unit 102 using an SNMP "Response" message and, at step 210, ends the remote diagnostics process 200 until an initiation event (discussed above) occurs. If so, STB 108 executes, at step 212, the internally stored diagnostics program and transmits, at step 214, the results (discussed in further detail below) back to head-end unit 102 using an SNMP "Response" message and, at step 216 ends the remote diagnostics process 200 until a initiation event (discussed above) occurs.

Figure 3:
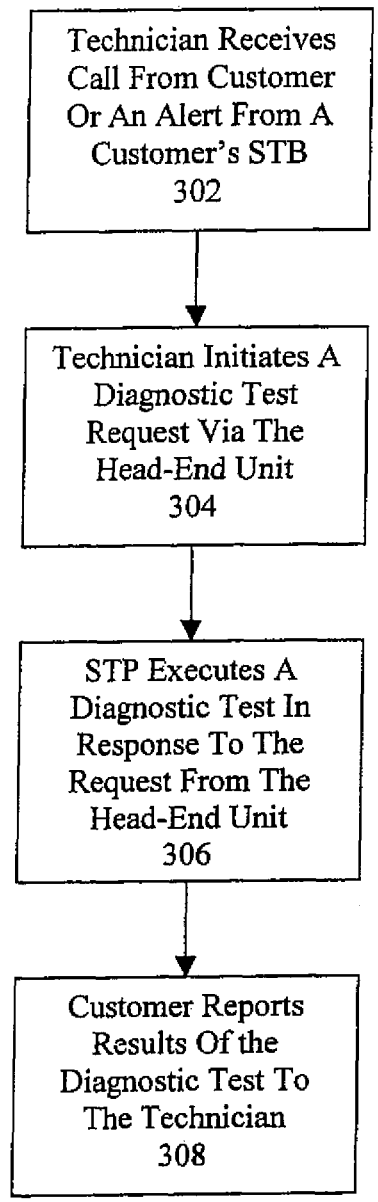
FIG. 3 is a flowchart of a customer-assisted remote diagnostics process of the present invention.

Referring now to FIG. 3, a flowchart of a customer-assisted remote diagnostics process 300 is shown. Initially, at step 302, the technician receives a call from a customer, an alert from the customer's STB 108, or some other initiation event known by those skilled in the art. Next, at step 304, the technician initiates a diagnostic test request, via the head-end unit 102, by sending special SNMP "Set Request" messages to the STB 108. Upon receipt of the request, at step 306, STB 108 (or more specifically, an internal processor of STB 108) executes an internally stored (preferably in ROM) diagnostics program that results in audio and/or video outputs being transmitted to an attached TV 112 that are observable by the customer. Some exemplary outputs are color bars displayed on TV 112 or a standard tone generated on a speaker of TV 112. Afterwards, at step 308, the customer reports, via a telephone, the type of audio and/or video outputs observed to the technician, as discussed in further detail below.

Figure 4:
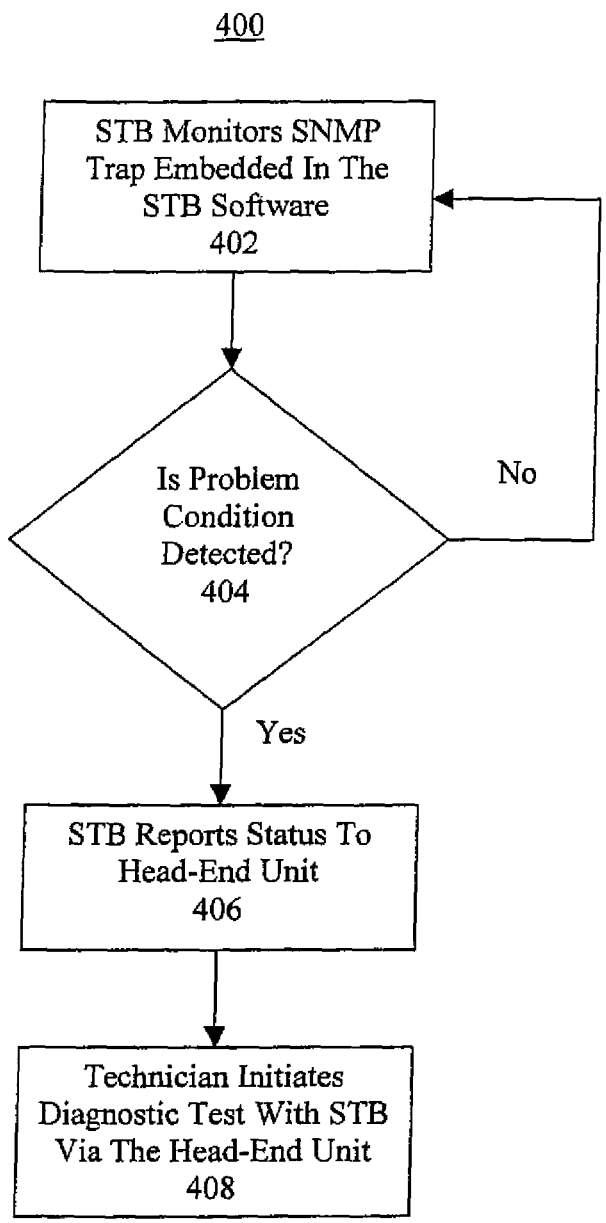
FIG. 4 is a flowchart of a self-monitoring STB process of the present invention.

Referring now to FIG. 4, a flowchart of a self-monitoring STB process 400 is shown. During process 400 the STB 108, at step 302, monitors various SNMP traps (discussed below) embedded in the STB software. If a problem condition is detected, at step 404, the STB 108 reports an alert or alarm message to head-end unit 102. If no problem condition is detected STB 108 returns to step 402 and continues to monitor the SNMP traps. Upon receipt of an alarm message, at step 408, a technician initiates the remote diagnostic process 200 (shown in FIG. 2) and/or customer-assisted remote diagnostic process 300 (shown in FIG. 3).

Figure 5:
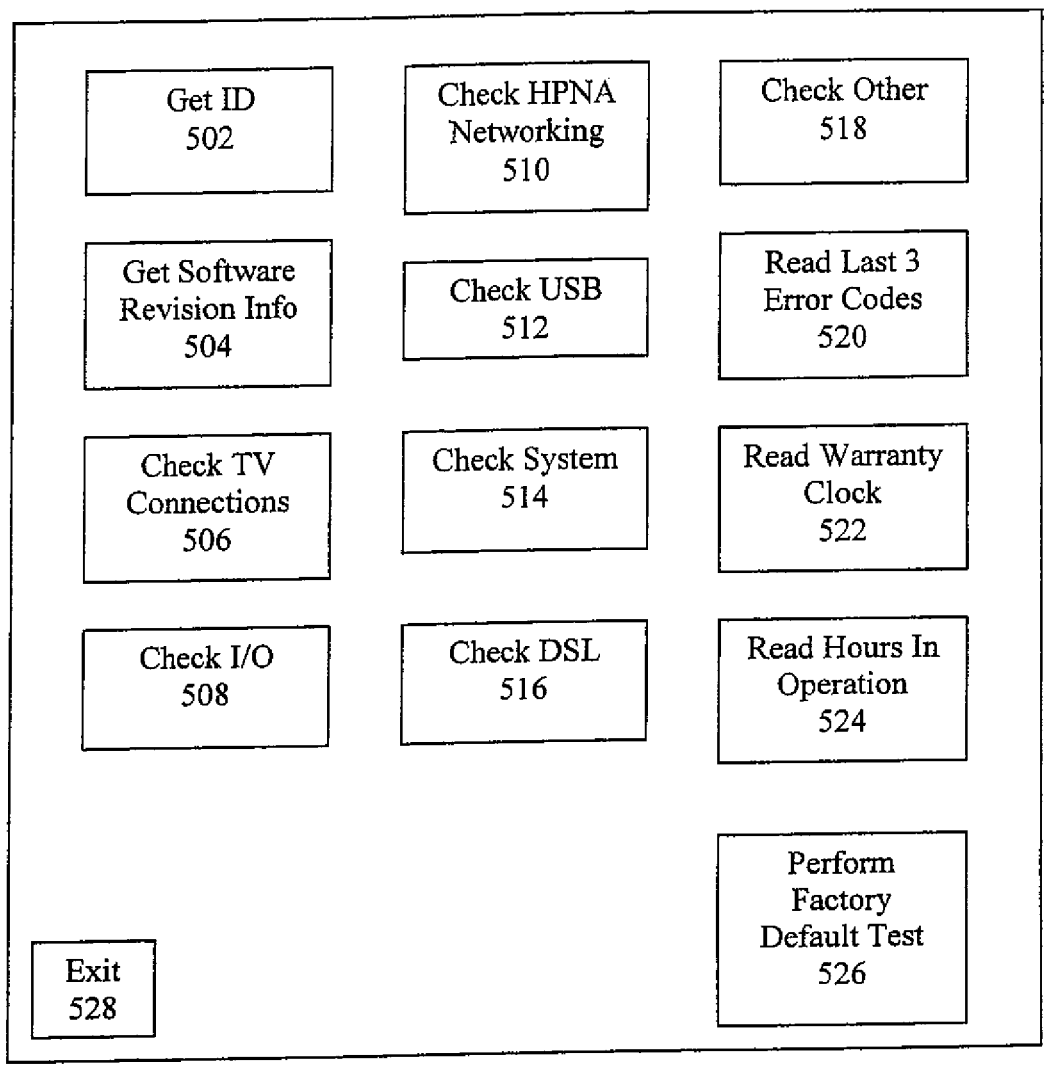
FIG. 5 is an exemplary service menu of the present invention.
Figure 6:
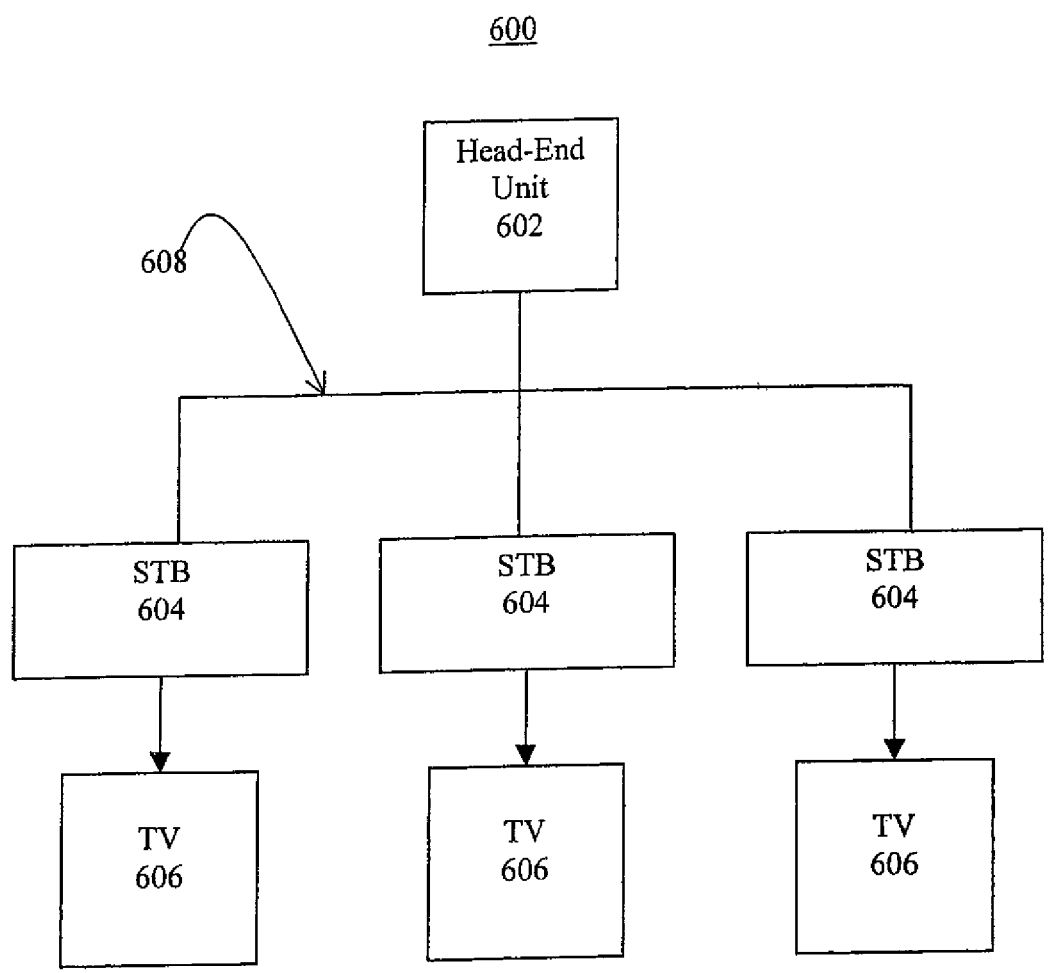
FIG. 6 is a block diagram of a conventional cable-based set-top box network.

Referring now to FIG. 5, an exemplary service menu 500 of the present invention is shown. Service menu 500 may be in a TIF format, a WMF format, A JPEG format, A GIF format, a DRW format, or any like graphical format known by one skilled in the art. It should be noted that the service menu is viewable by a technician operating the head-end unit 102 at a service center or by an operator on a service call located in the vicinity of the STB 108 connected to TV 112. As discussed above, the customer may be able to observe limited STB diagnostic tests such as color bars and/or speaker-generated tones. Service menu 500 may include, inter alia, a "Get ID" icon 502, a "Get Software Revision Info" icon 504, a "Check TV Connections" icon 506, a "Check I/O" icon 508, a "Check HPNA Networking" icon 510, a "Check USB" icon 512, a "Check System" icon 514, a "Check DSL" icon 516, a "Check Other" icon 518, a "Read Last 3 Error Codes" icon 520, a "Read Warranty Clock" icon 522, a "Read Hours In Operation" icon 524, a "Perform Factory Default Test" icon 526, and an "Exit" icon 528.

If the "Get ID" icon 502 is selected a request for instrument identification is transmitted to the STB 108. In response, the STB 108 should transmit a message including, inter alia, the STB manufacturer name, model name, and revision number.

Based on the response from the STB 108, the head-end unit 102 determines if the STB 108 has the necessary software required to perform the diagnostics tests requested by the head-end unit 102.

If the "Get Software Revision Info" icon 504 is selected a request for information on all software revisions is transmitted to the STB 108. This information is useful to identify if the STB has been hacked into by an unauthorized entity. For example, the revision information provided to the head-end unit 102 may be compared to a stored list of authorized or approved revisions. If there is a match, a remote technician can determine the current version of the software being run by the STB 108 and can update the software, as necessary. If there is not a match, the remote technician has evidence that the STB 108 may have been hacked or that some other critical error has occurred. The remote technician may then require the customer to return the STB 108 to the service center for further analysis.

If the "Check TV Connections" icon 506 is selected a request for a color bar to be displayed on a connected TV 112 and for a tone to be played to the TV's speaker(s) is transmitted to STB 108. After this request is transmitted the remote technician may ask the customer if the customer can see the color bars and hear the tone. If the customer cannot observe both the STB 108 may not be correctly connected to the TV 112 and the technician can review the connection process (in real time) with the customer.

If the "Check I/O" icon 508 is selected the I/O ports of the STB 108 are queried by the head-end unit 102 to determine what devices are connected to the STB 108.

If the "Check HPNA Networking" icon 510 is selected the STB 108 is queried by the head-end unit 102 about the health of the HPNA (phone line networking) communications between the STB 108 and another HPNA device. More specifically the STB 108 is directed to test and report bit-rate and bit-error rate when the STB is communicating with another HPNA device such as, but not limited to, another STB 108 in the customer's residence or the customer's personal computer.

If the "Check USB" icon 512 is selected the STB 108 is queried by the head-end unit 102 about the health of USB communications between the STB 108 and a USB device such as, but not limited to, a modem, printer, or mouse. The STB 108 will also report if any USB devices are detected.

If the "Check System" icon 514 is selected the STB 108 is queried by the head-end unit 102 about the status (e.g., on, off, etc.) of any major ICs on the board.

If the "Check DSL" icon 516 is selected the STB 108 is queried by the head-end unit 102 about the bit-error rate of the DSL connection. Optionally the counters are reset when the test is complete.

If the "Check Other" icon 518 is selected the STB 108 is queried by the head-end unit 102 about other major subsystems (e.g., LED status, IR status, Keyboard status, Smart Card interface status, and the like) such that the remote technician can diagnose other portions of the STB 108.

If the "Read Last 3 Error Codes" icon 520 is selected the STB 108 is queried by the head-end unit 102 to provide the last three errors it recorded. This provides evidence to the remote technician about possible STB problems. The errors are preferably stored in a first, second and last order of occurrence and are updated on a "First-In-First-Out" basis.

If the "Read Warranty Clock" icon 522 is selected the STB 108 is queried by the head-end unit 102 to provide the activation date of the STB 108.

If the "Read Hours In Operation" icon 524 is selected the STB 108 is queried by the head-end unit 102 to provide the value of an internal counter known as the hours in operation counter. This value will show the remote technician how long (e.g., days/hours) the STB has been in use. The hours in operation is used by the head-end unit 102 to generate parametric data that facilitates the remote technician's ability to predict the possibility of component failure.

If the "Perform Factory Default Test" icon 526 is selected the STB 108 is reset to it's initial (i.e., out of box) state. It should be noted that this does not reset the hours in use counter.

If the "Exit" icon 528 is selected the STB 108 exits the service menu screen.

While the present invention has been described with reference to the preferred embodiments, it is apparent that various changes may be made in the embodiments without departing from the spirit and the scope of the invention, as defined by the appended claims.

What is claimed is:

1. A method for remote diagnostics in a Digital Subscriber Line (DSL) network having a head-end unit and a device having diagnostics software, the method comprising:
   receiving a data request from the head-end unit at the device in response to a request from a user;
   determining if the received data request requires the device to execute an internal diagnostics program;
   transmitting a first response from the device to the head end unit in response to the reception of the data request if data request does not require the device to execute the internal diagnostics program;
   placing the device in a service mode in response to the reception of the data request if the data request requires the device to execute the internal diagnostics program, the device being placed in the service mode as a result of a flag being set in the device by the data request from the head-end; and
   transmitting a second response containing the requested data from the device to the head-end unit, the requested data in the second response including at least one of an error code, instrument identification, software revision, bit-rate, and bit-error rate and wherein the device resides at a customer's residence.

2. The method of claim 1, wherein placing the device in a service mode further includes executing the diagnostics software of the device in response to the reception of the data request and the step of transmitting the second response occurs upon completion of the execution of the diagnostics software.

3. The method of claim 1, wherein transmitting the data request includes transmitting the data request in response to an alert message received from the device.

4. The method of claim 1, wherein the data request is one of a device identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request.

5. In a Digital Subscriber Line system having a head-end unit and a plurality of devices, a device comprising:
   a first interface for communicating with the head-end unit;
   a storage medium for storing diagnostics software; and
   a processor for executing the stored diagnostics software and placing the device in a service mode in response to a data request received from the head-end unit, the device being placed in the service mode as a result of a flag being set in the device by the data request from the head-end, the processor transmitting a response to the requested data after placing the device in the service mode, the response including at least one of an error code, instrument identification, software revision, bit-rate, and bit-error rate,
   wherein the device resides at a customer's residence and wherein the data request is received from the head-end unit in response to a request from a user.

6. The device of claim 5, wherein the processor transmits the second response to the head-end unit via the first interface upon completion of the execution of the diagnostics software.

7. The device of claim 5, wherein the storage medium also stores a Simple Network Management Protocol (SNMP) trap in the storage medium and initiates communication with the head end unit via the first interface when the trap is tripped.

8. The device of claim 5, further comprising:
   a second interface for passing video and audio data to a television.

9. The device of claim 8, wherein the executed diagnostics software instructs the processor to pass audio data and video data to the television via the second interface.

10. The device of claim 9, wherein the audio data causes the television to generate an audible tone and the video data causes the television to display a set of color bars.

11. A method for remote diagnostics in a Digital Subscriber Line (DSL) network having a head-end unit and a device having diagnostics software, the method comprising:
   receiving a data request from the head-end unit to the device in response to a request from a user;
   determining if the received data request requires the device to execute an internal diagnostics program;
   transmitting a first response from the device to the head end unit in response to the reception of the data request if data request does not require the device to execute the internal diagnostics program, the internal diagnostics program residing in the device;
   executing the internal diagnostics program in response to the reception of the data request if the data request requires the device to execute the internal diagnostics program, the internal diagnostics program executed when the device is placed in a service mode, the device being placed in the service mode as a result of a flag being set in the device by the data request from the head-end; and
   transmitting a second response containing the requested data from the device to the head-end unit, the requested data in the second response including at least one of an error code, instrument identification, software revision, bit-rate, and bit-error rate and wherein the device resides at a customer's residence.

12. The method of claim 11, wherein transmitting the second response occurs upon completion of the execution of the diagnostics software.

13. The method of claim 11, wherein transmitting the data request includes transmitting the data request in response to an alert message received from the device.

14. The method of claim 11, wherein the data request is one of a device identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request.

15. In a Digital Subscriber Line system having a head-end unit and a plurality of devices, a device comprising:
   a first interface for communicating with the head-end unit;

a storage medium for storing diagnostics software, the diagnostics software residing in the device; and a processor for executing the stored diagnostics software in response to a data request received from the head-end unit, the processor transmitting a first response to the requested data through the first interface if the data request does not require the processor to execute the internal diagnostics program and transmitting a second response to the requested data through the first interface after executing the diagnostics software if the data request requires the processor to execute the internal diagnostics program, the diagnostics software executed when the device is placed in a service mode, the device being placed in the service mode as a result of a flag being set in the device by the data request from the head-end, the response including at least one of an error code, instrument identification, software revision, bit-rate, and bit-error rate, wherein the device resides at a customer's residence and wherein the data request is received from the head-end unit in response to a request from the device.

16. The device of claim 15, wherein the processor further transmits the second response to the head-end unit via the first interface upon completion of the execution of the diagnostics software.

17. The device of claim 15, wherein the storage medium also stores a Simple Network Management Protocol (SNMP) trap in the storage medium and initiates communication with the head end unit via the first interface when the trap is tripped.

18. The device of claim 15, further comprising:
a second interface for passing video and audio data to a television.

19. The device of claim 18, wherein the executed diagnostics software instructs the processor to pass audio data and video data to the television via the second interface.

20. The device of claim 19, wherein the audio data causes the television to generate an audible tone and the video data causes the television to display a set of color bars.

21. The device of claim 15, wherein the head-end transmits the data request in response to an alert message received from the device.

22. The device of claim 15, wherein the data request is one of a device identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request.

23. The method of claim 11, further comprising:
storing a Simple Network Management Protocol (SNMP) trap in a storage medium; and
initiating communication with the head end unit via the first interface when the trap is tripped.

24. The method of claim 11, further comprising passing video and audio data to a television.

25. The method of claim 24, wherein the audio data and video data is passed in response to instructions from the executed diagnostics software.

26. The method of claim 25, wherein the audio data causes the television to generate an audible tone and the video data causes the television to display a set of color bars.

27. The device of claim 5, wherein the head-end unit transmits the data request in response to an alert message received from the device.

28. The device of claim 5, wherein the data request is one of a device identification request, a software version request, a check television connections request, a check I/O ports request, a check HPNA networking request, a check USB request, a check system ICs request, a check DSL connection request, a check error codes request, a read warranty clock request, a read hours of operation request, and a perform default test request.

29. The method of claim 1, further comprising:
storing a Simple Network Management Protocol (SNMP) trap in a storage medium; and
initiating communication with the head end unit via the first interface when the trap is tripped.

30. The method of claim 1, further comprising passing video and audio data to a television.

31. The method of claim 30, wherein the audio data and video data is passed in response to instructions from the executed diagnostics software.

32. The device of claim 31, wherein the audio data causes the television to generate an audible tone and the video data causes the television to display a set of color bars.

33. The method of claim 1, further comprising exiting the service mode in the device after transmitting the second response.

34. The apparatus of claim 5, wherein the processor exits the service mode in the device after transmitting the second response.

35. The method of claim 11, further comprising exiting the service mode in the device after transmitting the second response.

36. The method of claim 1, wherein the processor exits the service mode in the device after transmitting the second response.

* * * * *